(12) United States Patent
Matsubaguchi et al.

(10) Patent No.: US 8,883,329 B2
(45) Date of Patent: Nov. 11, 2014

(54) HEXAGONAL FERRITE MAGNETIC POWDER AND METHOD OF MANUFACTURING THE SAME, AND MAGNETIC RECORDING MEDIUM AND METHOD OF MANUFACTURING THE SAME

(75) Inventors: Satoshi Matsubaguchi, Odawara (JP); Ayako Matsumoto, Odawara (JP); Toshio Tada, Odawara (JP); Akira Manabe, Haibara-gun (JP)

(73) Assignee: FUJIFILM Corporation, Tokyo (JP)

( * ) Notice: Subject to any disclaimer, the term of this patent is extended or adjusted under 35 U.S.C. 154(b) by 548 days.

(21) Appl. No.: 12/791,529

(22) Filed: Jun. 1, 2010

(65) Prior Publication Data
US 2010/0304187 A1    Dec. 2, 2010

(30) Foreign Application Priority Data

Jun. 2, 2009 (JP) ................. 2009-132903

(51) Int. Cl.
| | | |
|---|---|---|
| G11B 5/708 | (2006.01) | |
| G11B 5/706 | (2006.01) | |
| B82Y 30/00 | (2011.01) | |
| C01G 49/00 | (2006.01) | |
| C04B 35/26 | (2006.01) | |
| C04B 35/628 | (2006.01) | |
| C04B 35/653 | (2006.01) | |
| H01F 1/11 | (2006.01) | |
| H01F 41/16 | (2006.01) | |

(52) U.S. Cl.
CPC ............ *G11B 5/70678* (2013.01); *B82Y 30/00* (2013.01); *C01G 49/0036* (2013.01); *C04B 35/2633* (2013.01); *C04B 35/2683* (2013.01); *C04B 35/6281* (2013.01); *C04B 35/62886* (2013.01); *C04B 35/653* (2013.01); *H01F 1/11* (2013.01); *H01F 41/16* (2013.01); *C01P 2002/52* (2013.01); *C01P 2004/64* (2013.01); *C01P 2006/42* (2013.01); *C04B 2235/3215* (2013.01); *C04B 2235/3251* (2013.01); *C04B 2235/3274* (2013.01); *C04B 2235/3275* (2013.01); *C04B 2235/3284* (2013.01); *C04B 2235/3409* (2013.01); *C04B 2235/5292* (2013.01); *C04B 2235/5409* (2013.01); *C04B 2235/5454* (2013.01); *C04B 2235/767* (2013.01)

USPC .................................. 428/842.8; 252/62.51 R (58) Field of Classification Search
None
See application file for complete search history.

(56) References Cited

U.S. PATENT DOCUMENTS 4,341,648 A * 7/1982 Kubo et al. ................ 252/62.63
5,059,469 A * 10/1991 Hashimoto et al. ........... 428/141
(Continued)

FOREIGN PATENT DOCUMENTS

JP       4-032005 B2      12/1988
JP       2002-313619 A    10/2002
(Continued)

OTHER PUBLICATIONS

Office Action dated Aug. 21, 2012 in Japanese Application No. JP 2009-132903.

*Primary Examiner* — Holly Rickman
*Assistant Examiner* — Linda Chau
(74) *Attorney, Agent, or Firm* — Sughrue Mion, PLLC (57) ABSTRACT

An aspect of the present invention relates to a hexagonal ferrite magnetic powder manufactured by a glass crystallization method as well as having an average plate diameter ranging from 15 to 25 nm, an average plate ratio ranging from 2.0 to 2.8 and a coercive force (Hc) ranging from 159 to 279 kA/m.

16 Claims, 1 Drawing Sheet

(56) References Cited

U.S. PATENT DOCUMENTS

| | | | |
|---|---|---|---|
| 5,087,501 A * | 2/1992 | Takeuchi et al. | 428/141 |
| 5,419,938 A * | 5/1995 | Kagotani et al. | 428/839.3 |
| 5,470,645 A * | 11/1995 | Oguchi et al. | 428/212 |
| 5,530,609 A * | 6/1996 | Koga et al. | 360/131 |
| 2004/0219392 A1 * | 11/2004 | Zinbo et al. | 428/694 BB |
| 2005/0282043 A1 | 12/2005 | Yamazaki et al. | |

FOREIGN PATENT DOCUMENTS

| | | |
|---|---|---|
| JP | 2003-308608 A | 10/2003 |
| JP | 2006-005299 A | 1/2006 |
| JP | 2007-091517 A | 4/2007 |
| JP | 2007-305208 A | 11/2007 |

* cited by examiner

HEXAGONAL FERRITE MAGNETIC POWDER AND METHOD OF MANUFACTURING THE SAME, AND MAGNETIC RECORDING MEDIUM AND METHOD OF MANUFACTURING THE SAME

CROSS-REFERENCE TO RELATED APPLICATIONS

This application claims the benefit of priority under 35 USC 119 to Japanese Patent Application No. 2009-132903, filed on Jun. 2, 2009, which is expressly incorporated herein by reference in its entirety.

BACKGROUND OF THE INVENTION

1. Field of the Invention

The present invention relates to a hexagonal ferrite magnetic powder and to a method of manufacturing the same, and more particularly, to a microparticulate hexagonal ferrite magnetic powder with high coercive force and a low plate ratio, and to a method of manufacturing the same.

The present invention further relates to a magnetic recording medium employing the above hexagonal ferrite magnetic powder, and to a method of manufacturing the same.

2. Discussion of the Background

Recently, ferromagnetic metal powders have come to be primarily employed in the magnetic layers of magnetic recording media for high-density recording. Ferromagnetic metal powders are comprised of acicular particles of mainly iron, and are employed in magnetic recording media for various applications in which minute particle size and high coercive force are required for high-density recording.

With the increase in the quantity of information being recorded, magnetic recording media are required to achieve ever higher recording densities. However, in improving the ferromagnetic metal powder to achieve higher density recording, limits have begun to appear. By contrast, hexagonal ferrite magnetic powders have a coercive force that is high enough for use in permanently magnetic materials. Magnetic anisotropy, which is the basis of coercive force, derives from a crystalline structure. Thus, high coercive force can be maintained even when the particle size is reduced. Further, magnetic recording media employing hexagonal ferrite magnetic powder in the magnetic layers thereof can afford good high-density characteristics due to their vertical components. Thus, hexagonal ferrite magnetic powder is an optimal ferromagnetic material for achieving high density. Hexagonal ferrite magnetic powders are normally manufactured by a glass crystallization method (see Japanese Unexamined Patent Publication (KOKAI) No. 2006-5299 or English language family member US2005/0282043A1 and Japanese Unexamined Patent Publication (KOKAI) No. 2002-313619), a coprecipitation method (see Japanese Examined Patent Publication (KOKOKU) Heisei No. 4-32005), and the like. The contents of the above applications are expressly incorporated herein by reference in their entirety.

A high S/N ratio is required for increase of the recording density of a magnetic recording medium. Setting the coercive force Hc high to inhibit recording demagnetization or self-demagnetization when recording at short wavelengths and designing the particles of magnetic powder to be as small as possible to inhibit noise are known to be effective ways to raise the S/N ratio. However, conventionally employed manufacturing methods, such as the methods described in the above applications, tend to increase the plate ratio when reducing the plate diameter. The quantity of elements substituting for a portion of Fe is reduced to raise the Hc of hexagonal ferrite. Although an increase in Hc can be achieved by simply reducing the quantity of the elements that substitute Fe, the plate ratio of the particles increases. Reduction of the filling density of hexagonal ferrite particles and aggregation of the particles, known as stacking, occur in the magnetic layer of the magnetic recording medium when the plate ratio increases. This results in an increase in noise, making it difficult to achieve adequate performance as a magnetic recording medium for high-density recording.

By contrast, Japanese Unexamined Patent Publication (KOKAI) No. 2007-91517, which is expressly incorporated herein by reference in its entirety, describes the forming of a coprecipitate comprised of a desired hexagonal magnetoplumbite-type ferrite by the reverse micelle method, and the use of this coprecipitate to obtain hexagonal magnetoplumbite-type ferrite.

The hexagonal ferrite obtained by the method described in Japanese Unexamined Patent Publication (KOKAI) No. 2007-91517 has both a low average plate diameter and a low plate ratio, as well as a high Hc. Thus, the use of this hexagonal ferrite can yield a magnetic recording medium with a higher S/N ratio than magnetic recording media in which hexagonal ferrite obtained by conventional manufacturing methods is employed. However, as the recording density is further increased, there is need for an even higher S/N ratio, exceeding the S/N ratio that can be achieved by the technique described in Japanese Unexamined Patent Publication (KOKAI) No. 2007-91517.

SUMMARY OF THE INVENTION

An aspect of the present invention provides for a hexagonal ferrite magnetic powder permitting the fabrication of a magnetic recording medium with a markedly higher S/N ratio.

The present inventors conducted extensive research for the technique described in Japanese Unexamined Patent Publication (KOKAI) No. 2007-91517, discovering that, in the reverse micelle method, when the particles are rendered magnetic by the ferrite treatment in air following drying, they tend to magnetically aggregate and this aggregation causes noise.

Accordingly, the present inventors conducted further extensive research based on the above knowledge, resulting in the discovery that the use of hexagonal ferrite magnetic powder with an average particle diameter of 15 to 25 nm, an average plate ratio of 2.0 to 2.8, and a coercive force (Hc) of 159 to 279 kA/m that was manufactured by the glass crystallization method made it possible to obtain a magnetic recording medium exhibiting a high S/N ratio. The present invention was devised on that basis.

An aspect of the present invention relates to a hexagonal ferrite magnetic powder manufactured by a glass crystallization method as well as having an average plate diameter ranging from 15 to 25 nm, an average plate ratio ranging from 2.0 to 2.8 and a coercive force (Hc) ranging from 159 to 279 kA/m.

The above hexagonal ferrite magnetic powder may comprise, as an element substituting for Fe, just a pentavalent element selected from the group consisting of Nb and Ta.

The above hexagonal ferrite magnetic powder may comprise the pentavalent element in a quantity of equal to or greater than 2.5 atomic percent when a sum of the pentavalent element and Fe is adopted as 100 atomic percent.

The above hexagonal ferrite magnetic powder may comprise the pentavalent element in a quantity ranging from 2.5 atomic percent to 6 atomic percent when a sum of the pentavalent element and Fe is adopted as 100 atomic percent.

The above hexagonal ferrite magnetic powder may comprise just Nb as the pentavalent element.

A further aspect of the present invention relates to a method of manufacturing a hexagonal ferrite magnetic powder comprising:

preparing a melt by melting a starting material mixture comprising a glass-forming component and a hexagonal ferrite-forming component;

rapidly cooling the melt to obtain a solid; and heating the solid to precipitate a hexagonal ferrite magnetic powder, wherein the hexagonal ferrite-forming component comprises, as a component substituting for Fe, just a pentavalent element component selected from the group consisting of $Nb_2O_5$ component and $Ta_2O_5$ component, and the starting material mixture comprises a pentavalent element selected from the group consisting of Nb and Ta in a quantity of equal to or greater than 2.5 atomic percent when a sum of the pentavalent element and Fe is adopted as 100 atomic percent.

In the above method of manufacturing a hexagonal ferrite magnetic powder, the pentavalent element component may consist of $Nb_2O_5$ component.

In the above method of manufacturing a hexagonal ferrite magnetic powder, the starting material mixture may comprise a pentavalent element selected from the group consisting of Nb and Ta in a quantity ranging from 2.5 atomic percent to 6 atomic percent when a sum of the pentavalent element and Fe is adopted as 100 atomic percent.

A still further aspect of the present invention relates to a magnetic recording medium comprising a magnetic layer comprising the above hexagonal ferrite magnetic powder and a binder on a nonmagnetic support.

A still further aspect of the present invention relates to a method of manufacturing a magnetic recording medium comprising:

manufacturing a hexagonal ferrite magnetic powder by the above method of manufacturing a hexagonal ferrite magnetic powder; and forming a magnetic layer using the hexagonal ferrite magnetic powder manufactured.

The present invention can provide a magnetic recording medium exhibiting an extremely good S/N ratio.

Other exemplary embodiments and advantages of the present invention may be ascertained by reviewing the present disclosure and the accompanying drawing.

BRIEF DESCRIPTION OF THE DRAWINGS

The present invention will be described in the following text by the exemplary, non-limiting embodiments shown in the FIGURE, wherein.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

Hexagonal Ferrite Magnetic Powder

The hexagonal ferrite magnetic powder of the present invention has an average plate diameter ranging from 15 to 25 nm, an average plate ratio ranging from 2.0 to 2.8, a coercive force (Hc) ranging from 159 to 279 (2,000 to 3,500Oe), and it was manufactured by the glass crystallization method. The present invention was devised by the present inventors based on the discovery that by using a hexagonal ferrite magnetic powder of the stated particle size and Hc level that was manufactured by the glass crystallization method, it was possible to obtain a marked S/N ratio-enhancing effect that could not be achieved with the hexagonal ferrite magnetic powder described in Japanese Unexamined Patent Publication (KOKAI) No. 2007-91517 having the same particle size and Hc level. The present inventors attribute the good S/N ratio-enhancing effect of hexagonal ferrite magnetic powder obtained by the glass crystallization method among hexagonal ferrite magnetic powders of the stated particle size and Hc level to the following.

As set forth above, the present inventors conducted research resulting in the discovery that, in the reverse micelle method, magnetic particles tended to magnetically aggregate and this aggregation caused noise; this was specifically occurred in the reverse micelle method. By contrast, in the glass crystallization method, ferrite formation and particle growth progress in the glass components, and thus the glass components can inhibit magnetic aggregation of particles that have been rendered magnetic. The degree of aggregation of magnetic particles can be determined by TEM (transmission electron microscope) observation or measurement of the magnetic characteristics of the magnetic particles. That is, magnetic particles of similar average plate diameter, average plate ratio, and Hc that have undergone considerable aggregation have a high switching field distribution (SFD), while those that have undergone little aggregation have a low SFD. The SFD is an index of the sharpness of magnetic reversal. Magnetic particles with a low SFD can undergo uniform magnetic reversal based on an external magnetic field of prescribed magnitude. Thus, a medium containing magnetic powder in the form of magnetic particles with a low SFD will yield a high S/N ratio even at high recording densities. The hexagonal ferrite magnetic powder of the present invention can exhibit, for example, an SFD falling within a range of equal to or lower than 0.90, or falling within a range of 0.30 to 0.85.

The fact that a hexagonal ferrite magnetic powder has been obtained by the glass crystallization method can be determined by detecting elements (boron, silicon, and the like) derived from glass components by ICP analysis, for example.

The hexagonal ferrite magnetic powder of the present invention will be described in greater detail below.

The average plate diameter of the hexagonal ferrite magnetic powder of the present invention falls within a range of 15 to 25 nm. At an average plate diameter of less than 15 nm, adequate magnetic characteristics cannot be achieved, and at greater than 25 nm, noise increases. In both of these cases, it is difficult to ensure the S/N ratio required of a magnetic recording medium for use in high-density recording. From the perspective of enhancing the S/N ratio, the average plate diameter is desirably 17 to 21 nm, preferably falling within a range of 18 to 20 nm.

The average plate ratio of the hexagonal ferrite magnetic powder of the present invention falls within a range of 2.0 to 2.8. At an average plate ratio of less than 2.0, it is impossible to balance magnetic characteristics, and at greater than 2.8, the magnetic powder filling rate decreases in the magnetic layer and a reduction in noise due to stacking is observed. The average plate ratio is desirably 2.3 to 2.8, preferably falling within a range of 2.5 to 2.8.

The average plate diameter of the hexagonal ferrite magnetic powder of the present invention is the arithmetic average of the values of the plate diameters measured for 500 particles randomly selected in a photograph taken by a transmission electron microscope (TEM photograph). The average plate ratio is the arithmetic average of the measured values of the (plate diameter/plate thickness) for 500 particles randomly selected in a TEM photograph.

The coercive force (Hc) of the hexagonal ferrite magnetic powder of the present invention is 159 to 279 kA/m (2,000 to 3,5000e). When the Hc is less than 159 kA/m, high-density recording becomes difficult, and when it exceeds 279 kA/m, overwriting becomes difficult, noise increases, the head recording current is inadequate, and recording is sometimes precluded. To achieve a good S/N ratio in high-density recording, the Hc is desirably 167 to 270 kA/m, preferably falling within a range of 175 to 260 kA/m.

The specific surface area of the hexagonal ferrite magnetic power of the present invention is desirably 45 to 80 m²/g, as a value obtained by the BET method ($S_{BET}$). Within the above range, it is possible to achieve both good dispersion and low noise.

The saturation magnetization, $\sigma_s$, of the hexagonal ferrite magnetic powder of the present invention desirably ranges from 35 A·m²/kg to 60 A·m²/kg (35 emu/g to 60 emu/g). Within the above range, a magnetic recording medium exhibiting good magnetic characteristics can be obtained.

The hexagonal ferrite magnetic powder of the present invention is one manufactured by the glass crystallization method as well as having the above-stated average plate diameter, average plate ratio, and Hc. As set forth above, it is difficult to achieve a reduction in the average plate diameter, an increase in Hc, and a reduction in the average plate ratio in conventional hexagonal ferrite magnetic powder. By contrast, it is possible to obtain hexagonal ferrite magnetic powder with a low average plate diameter, a low average plate ratio, and a high Hc by the glass crystallization method by means of the method of manufacturing a hexagonal ferrite magnetic powder of the present invention set forth further below. The hexagonal ferrite magnetic powder obtained in this manner contains only pentavalent elements selected from the group consisting of Nb and Ta as elements substituting for Fe (trivalent iron). That is, the hexagonal ferrite magnetic powder of the present invention can contain only the stated pentavalent elements as elements substituting for Fe. The quantity of the pentavalent elements, when the sum of the pentavalent elements and Fe is adopted as 100 atomic percent, is equal to or greater than 2.5 atomic percent, for example. When the quantity of the pentavalent elements exceeds a certain value, the change in the magnetic characteristics of the hexagonal ferrite magnetic powder caused by the addition of the pentavalent elements becomes extremely small. This is attributed to the pentavalent elements being incorporated at specific sites within the crystals, thereby burying these sites and preventing further incorporation. Research conducted by the present inventors has revealed that the upper limit of the quantity that is incorporated is about 6 atomic percent when the sum of the above pentavalent elements and Fe is adopted as 100 atomic percent. Accordingly, the upper limit of the quantity of the above pentavalent elements in the hexagonal ferrite magnetic powder of the present invention is also about 6 atomic percent, for example, when the combined quantity of the pentavalent elements and Fe is adopted as 100 atomic percent. The quantity of the pentavalent elements in the hexagonal ferrite magnetic powder can be measured by inductively coupled high frequency plasma (ICP) emission analysis. At a quantity of up to about 6 atomic percent, nearly the entire quantity of the pentavalent elements in the starting materials is incorporated into the crystals, so it can be viewed as being roughly identical to the quantity of pentavalent elements in the starting materials. From the perspective of magnetic characteristics, the hexagonal ferrite magnetic powder of the present invention desirably contains just Nb as an element substituting for Fe.

Method of Manufacturing Hexagonal Ferrite Magnetic Powder

The method of manufacturing a hexagonal ferrite magnetic powder of the present invention comprises the following steps and is suitable as a method of manufacturing the hexagonal ferrite magnetic powder of the present invention. However, the hexagonal ferrite magnetic powder that is obtained by the method of manufacturing a hexagonal ferrite magnetic powder of the present invention is not limited to the hexagonal ferrite magnetic powder of the present invention.

(1) Preparing a melt by melting a starting material mixture comprising a glass-forming component and a hexagonal ferrite-forming component;
(2) Rapidly cooling the melt to obtain a solid; and
(3) Heating the solid to precipitate a hexagonal ferrite magnetic powder.

In the manufacturing method of the present invention, the hexagonal ferrite-forming component comprises, as a component substituting for Fe, just a pentavalent element component selected from the group consisting of $Nb_2O_5$ component and $Ta_2O_5$ component, and the starting material mixture comprises a pentavalent element selected from the group consisting of Nb and Ta in a quantity of equal to or greater than 2.5 atomic percent when a sum of the pentavalent element and Fe is adopted as 100 atomic percent.

The method of manufacturing a hexagonal ferrite magnetic powder of the present invention will be described in greater detail below.

In the present invention, the term "hexagonal ferrite-forming component" refers to a component containing an element constituting the crystalline structure of hexagonal ferrite magnetic powder. Examples are metal oxides such as $Fe_2O_3$, BaO, SrO, and PbO. For example, the use of $Fe_2O_3$ and BaO as primary hexagonal ferrite-forming components yields a barium ferrite magnetic powder. In the method of manufacturing a hexagonal ferrite magnetic powder of the present invention, the starting material mixture that comprises a hexagonal ferrite-forming component comprising a component substituting for Fe in the form of just pentavalent element component selected from the group consisting of $Nb_2O_5$ component and $Ta_2O_5$ component is employed. In this context, the term "component substituting for Fe" means a component containing an element that is substituted for Fe (trivalent iron) in the crystalline structure of the hexagonal ferrite magnetic powder.

In the common glass crystallization method, a portion of the $Fe^{3+}$ is widely substituted with some other element to adjust the coercive force. In that case, the charge is compensated so that the combined charges of the substitution elements equal the charge of the iron atoms that have been substituted. Accordingly, in the conventional glass crystallization method, a portion of the Fe is not substituted with just pentavalent elements as is done in the present invention. By contrast, in the present invention, a portion of the Fe is substituted with just specified pentavalent elements without concern for charge balancing. Research conducted by the present inventors has revealed that substituting a portion of the Fe with the above pentavalent elements in this manner makes it possible to reduce the average plate diameter, reduce the average plate ratio, and raise the Hc—which is unachievable by the conventional glass crystallization method—and permits the manufacturing of the hexagonal ferrite magnetic powder of the present invention. Although the details are somewhat unclear, the following mechanisms are presumed to be present.

In the case of barium ferrite, for example, in the course of incorporating the above pentavalent elements into the barium ferrite crystals, a change in the lattice constant and lattice distortion are presumed to occur. The unit lattice of barium ferrite is longer in the c axis direction (plate thickness direction), at 23.19 Angstroms, than it is in the a axis direction (plate diameter direction), at 5.89 Angstroms. Thus, it is difficult to alleviate distortion in the a axis direction. During the process of crystal growth, to diminish distortion, growth in the a axis direction is inhibited, which is thought to result in a reduction in the plate ratio. However, among V, Mo, and W, which are all pentavalent elements, it was not possible to reduce the plate ratio with the reduction of the average plate diameter and increase of the Hc. Although the reason for this has not been established, the fact that Mo and W are stabilized as hexavalent oxides in the glass is thought to be why a plate ratio-reducing effect is precluded. In the starting material mixture, when the quantity of pentavalent elements selected from the group consisting of Nb and Ta is less than 2.5 atomic percent where the combined total of the pentavalent elements and Fe is adopted as 100 atomic percent, the substitution effect is inadequate and it is difficult to obtain a hexagonal ferrite magnetic powder of desired particle size and Hc. Accordingly, in the method of manufacturing a hexagonal ferrite magnetic powder of the present invention, a starting material mixture is employed such that the proportion of $Nb_2O_5$ and $Ta_2O_5$ components is equal to or greater than 2.5 atomic percent where the combined total of the pentavalent elements and Fe is adopted as 100 atomic percent. However, as set forth above, when the quantity of the pentavalent elements exceeds 6 atomic percent, the addition of a larger quantity produces no major change in the effect. Thus, the quantity of the pentavalent elements is desirably equal to or less than 6 atomic percent. The quantity of the pentavalent elements is preferably equal to or less than 5.5 atomic percent, more preferably equal to or less than 5 atomic percent, and still more preferably, falls within a range of 3.0 to 4.5 atomic percent.

The various components contained in the starting material mixture in the glass crystallization method are present as oxides or as various salts capable of converting to oxides when melted. In the present invention, the term "$Nb_2O_5$ component" means $Nb_2O_5$ itself and various salts capable of converting to $Nb_2O_5$ when melted. The same applies to other components such as the $Ta_2O_5$ component.

The term "glass-forming component" refers to a component that is capable of exhibiting a glass transition phenomenon to form an amorphous material (vitrify). A $B_2O_3$ component is normally employed as a glass-forming component in the glass crystallization method. In the present invention, as well, it is possible to employ a $B_2O_3$ component as the glass-forming component.

Figure 1:
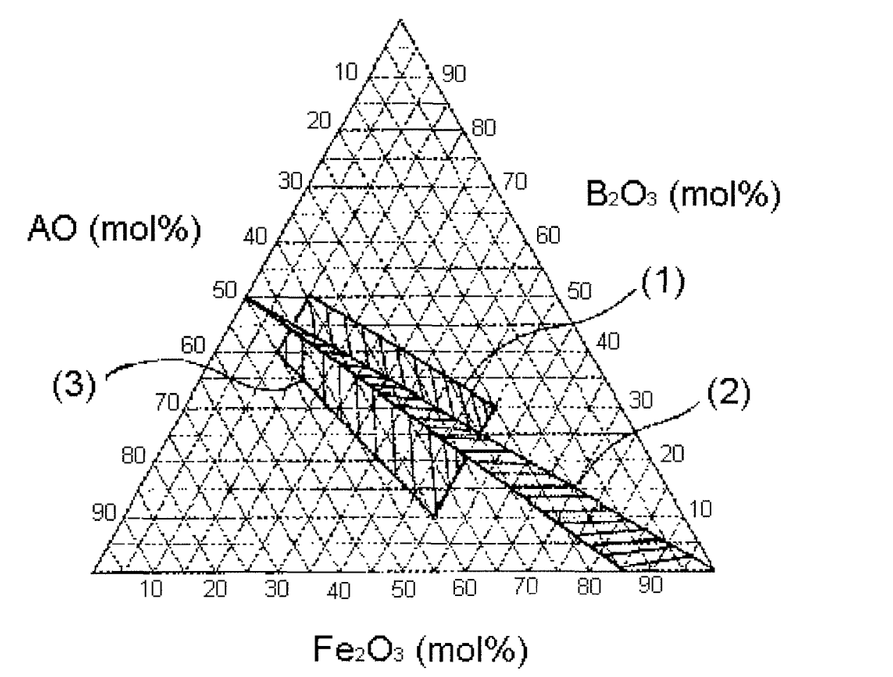
FIG. 1 is a descriptive drawing (triangular phase diagram) showing an example of the composition of the starting material mixture.

To achieve a high Hc and saturation magnetization $\sigma_s$, in the triangular phase diagram shown in FIG. 1, with AO (where A denotes at least one selected from among Ba, Sr, Ca, and Pb, for example), $B_2O_3$, and $Fe_2O_3$ as vertices, it is desirable to employ a starting material mixture within the composition regions of hatched portions (1) to (3). The starting materials within the component region (hatched portion (1)) defined by the four points a, b, c, and d below are particularly desirable. However, a portion of the $Fe_2O_3$ component is substituted with the above pentavalent elements in the present invention as set forth above.

(a) $B_2O_3$=50, AO=40, $Fe_2O_3$=10 mole percent
(b) $B_2O_3$=45, AO=45, $Fe_2O_3$=10 mole percent
(c) $B_2O_3$=25, AO=25, $Fe_2O_3$=50 mole percent
(d) $B_2O_3$=30, AO=20, $Fe_2O_3$=50 mole percent The above starting material mixture can be obtained by weighing out and mixing the various components.

Melting the Starting Material Mixture and Solidifying the Melt

In the present invention, the starting material mixture is melted to obtain a melt. The melting temperature is, for example, 1,200 to 1,500° C., desirably 1,300 to 1,400° C. The melting time can be suitably set so that the starting material mixture melts adequately during melting.

Next, the melt obtained is rapidly cooled to obtain a solid. The solid contains amorphous material in the form of glass-forming components that have been rendered amorphous (vitrified). The rapid cooling can be carried out in the same manner as in the rapid cooling step commonly employed to obtain an amorphous material in glass crystallization methods. For example, a known method can be conducted, such as a rapid cooling rolling method in which the melt is poured onto a pair of water-cooled rollers being rotated at high speed.

Heat Treating the Solid

Following the above rapid cooling, the solid obtained is subjected to a heat treatment. This step can cause the hexagonal ferrite particles to crystallize, precipitating out in the amorphous phase (glass phase). The heat treatment is conducted by heating the solid obtained by rapid cooling, desirably to within a temperature range of 600 to 750° C., and maintaining it within this temperature range for a prescribed period. The particle size of the hexagonal ferrite magnetic powder that precipitates can be controlled by means of the heating temperature and heating period. Conducting the heat treatment within the stated temperature range can cause microparticulate hexagonal ferrite to precipitate. The rate of rise in temperature up to the temperature range is suitably about 0.5 to 2° C./minute, for example. The period of maintenance within the temperature range is, for example, 2 to 24 hours, desirably 4 to 8 hours.

The product of the above heat treatment normally comprises hexagonal ferrite magnetic powders and an amorphous phase. Various processes generally employed in glass crystallization methods, such as acid treatment with heating, can be employed to remove the amorphous phase to obtain hexagonal ferrite magnetic powders. The particles from which the excess glass component has been removed by this treatment can be subjected as needed to post-processing, such as washing with water and drying, to obtain hexagonal ferrite magnetic powders that are suitable for use in magnetic recording media.

Magnetic Recording Medium and Method of Manufacturing the Same

The magnetic recording medium of the present invention comprises a magnetic layer comprising the hexagonal ferrite magnetic powder of the present invention and a binder on a nonmagnetic support.

The method of manufacturing a magnetic recording medium of the present invention comprises manufacturing a hexagonal ferrite magnetic powder by the method of manufacturing a hexagonal ferrite magnetic powder of the present invention and forming a magnetic layer using the hexagonal ferrite magnetic powder manufactured.

The magnetic recording medium of the present invention and the method of manufacturing a magnetic recording medium of the present invention will be described in greater detail below.

Magnetic Layer

Details of the hexagonal ferrite magnetic powder employed in the magnetic layer, and the method of manufacturing the powder, are as set forth above. When dispersing the hexagonal ferrite magnetic powder, the particle surface of the magnetic powder can be processed with a substance suited to a dispersion medium and a polymer. Both organic and inorganic compounds can be employed as surface treatment agents. Examples of the principal compounds are oxides and hydroxides of Si, Al, P, and the like; various silane coupling agents; and various titanium coupling agents. The quantity of surface treatment agent added normally range from 0.1 to 10 weight percent relative to the weight of the magnetic powder. The pH of the magnetic powder normally ranges from about 4 to 12, and is usually optimum for the dispersion medium and polymer. From the perspective of the chemical stability and storage properties of the medium, a pH of about 6 to 10 is usually selected. As for moisture contained in the magnetic powder, there is an optimum level for the dispersion medium and polymer, usually selected from the range of 0.01 to 2.0 weight percent.

In addition to hexagonal ferrite magnetic powder, the magnetic layer comprises a binder. Examples of the binder comprised in the magnetic layer are: polyurethane resins; polyester resins; polyamide resins; vinyl chloride resins; styrene; acrylonitrile; methyl methacrylate and other copolymerized acrylic resins; nitrocellulose and other cellulose resins; epoxy resins; phenoxy resins; and polyvinyl acetal, polyvinyl butyral, and other polyvinyl alkyral resins. These may be employed singly or in combinations of two or more. Of these, the desirable binders are the polyurethane resins, acrylic resins, cellulose resins, and vinyl chloride resins. These resins may also be employed as binders in the nonmagnetic layer described further below. A polyisocyanate curing agent may also be employed with the above resins.

To enhance the dispersibility of ferromagnetic powder and nonmagnetic powder in the above binder, the binder desirably comprises functional groups (polar groups) adsorbing to the surface of these powders. Examples of desirable functional groups are: $-SO_3M$, $-SO_4M$, $-PO(OM)_2$, $-OPO(OM)_2$, $-COOM$, $=NSO_3M$, $=NRSO_3M$, $-NR^1R^2$, and $-N^+R^1R^2R^3X^-$. In the above, M denotes hydrogen or an alkali metal such as Na or K; R denotes an alkylene group; $R^1$, $R^2$, and $R^3$ denote alkyl groups, hydroxyalkyl groups, or hydrogen; and X denotes a halogen such as Cl or Br. The quantity of functional groups in the binder is desirably equal to or higher than 10 µeq/g and equal to or lower than 200 µeq/g, preferably equal to or higher than 30 µeq/g and equal to or lower than 120 µeq/g. The quantity of functional groups desirably falls within the above range because good dispersibility can be achieved therein.

The molecular weight of the binder is desirably a weight average molecular weight of equal to or greater than 10,000 and equal to or lower than 200,000. The molecular weight desirably falls within the above range because adequate coating strength and good durability can be obtained and dispersibility can be increased.

The binder can be employed in a range of, for example, 5 to 50 weight percent, desirably 10 to 30 weight percent, of the nonmagnetic powder in the nonmagnetic layer or of the magnetic powder in the magnetic layer.

As needed, additives can be added to the magnetic layer. Examples of additives are: abrasives, lubricants, dispersing agents, dispersion adjuvants, antifungal agents, antistatic agents, oxidation inhibitors, solvents, and carbon black. These additives may be employed in the form of a commercial product suitably selected based on desired properties.

Examples of types of carbon black that are suitable for use in the magnetic layer are: furnace black for rubber, thermal for rubber, black for coloring, and acetylene black. It is preferable that the specific surface area is 5 to 500 $m^2/g$, the DBP oil absorption capacity is 10 to 400 ml/100 g, the particle diameter is 5 to 300 nm, the pH is 2 to 10, the moisture content is 0.1 to 10 percent, and the tap density is 0.1 to 1 g/ml. When employing carbon black, the quantity preferably ranges from 0.1 to 30 weight percent with respect to the weight of the ferromagnetic powder. For example, the *Carbon Black Handbook* compiled by the Carbon Black Association, which is expressly incorporated herein by reference in its entirety, may be consulted for types of carbon black suitable for use in the present invention. Commercially available carbon black can be employed.

As needed, the types and quantities of additives employed in the magnetic layer may differ from those employed in the nonmagnetic layer, described further below, in the present invention. All or some part of the additives employed in the present invention can be added in any of the steps during the manufacturing of coating liquids for the magnetic layer and nonmagnetic layer. For example, there are cases where they are mixed with the magnetic powder prior to the kneading step; cases where they are added during the step in which the magnetic powder, binder, and solvent are kneaded; cases where they are added during the dispersion step; cases where they are added after dispersion; and cases where they are added just before coating.

Nonmagnetic Layer

Details of the nonmagnetic layer will be described below. The magnetic recording medium of the present invention may comprise a nonmagnetic layer comprising a nonmagnetic powder and a binder between the nonmagnetic support and the magnetic layer. Both organic and inorganic substances may be employed as the nonmagnetic powder in the nonmagnetic layer. Carbon black may also be employed. Examples of inorganic substances are metals, metal oxides, metal carbonates, metal sulfates, metal nitrides, metal carbides, and metal sulfides. These nonmagnetic powders are commercially available and can be manufactured by the known methods.

Specifically, titanium oxides such as titanium dioxide, cerium oxide, tin oxide, tungsten oxide, ZnO, $ZrO_2$, $SiO_2$, $Cr_2O_3$, α-alumina with an α-conversion rate of 90 to 100 percent, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide may be employed singly or in combinations of two or more. α-iron oxide and titanium oxide are preferred.

The nonmagnetic powder may be acicular, spherical, polyhedral, or plate-shaped. The crystallite size of the nonmagnetic powder preferably ranges from 4 nm to 500 nm, more preferably from 40 to 100 nm. A crystallite size falling within a range of 4 nm to 500 nm is desirable in that it facilitates dispersion and imparts a suitable surface roughness. The average particle diameter of the nonmagnetic powder falling within a range of 5 nm to 500 nm is desirable in that dispersion can be good and a nonmagnetic layer with suitable surface roughness can be achieved. However, as needed, nonmagnetic powders of differing average particle diameter may be combined; the same effect may be achieved by broadening the average particle distribution of a single nonmagnetic powder. The particularly preferred average particle diameter of the nonmagnetic powder ranges from 10 to 200 nm.

The specific surface area of the nonmagnetic powder preferably ranges from 1 to 150 $m^2/g$, more preferably from 20 to 120 $m^2/g$, and further preferably from 50 to 100 $m^2/g$. Within the specific surface area ranging from 1 to 150 $m^2/g$, a nonmagnetic layer with suitable surface roughness can be achieved and dispersion of the nonmagnetic powder is possible with the suitable quantity of binder; the above range is preferred. Oil absorption capacity using dibutyl phthalate (DBP) of the nonmagnetic powder preferably ranges from 5 to 100 mL/100 g, more preferably from 10 to 80 mL/100 g, and further preferably from 20 to 60 mL/100 g. The specific gravity ranges from, for example, 1 to 12, preferably from 3 to 6. The tap density ranges from, for example, 0.05 to 2 g/mL, preferably from 0.2 to 1.5 g/mL. A tap density falling within a range of 0.05 to 2 g/mL can reduce the amount of scattering particles, thereby facilitating handling, and tends to prevent solidification to the device. The pH of the nonmagnetic powder preferably ranges from 2 to 11, more preferably from 6 to 9. When the pH falls within a range of 2 to 11, increase of the coefficient of friction at high temperature or high humidity or due to the freeing of fatty acids can be prevented. The moisture content of the nonmagnetic powder preferably ranges from 0.1 to 5 weight percent, more preferably from 0.2 to 3 weight percent, and further preferably from 0.3 to 1.5 weight percent. A moisture content falling within a range of 0.1 to 5 weight percent is desirable because it can produce good dispersion and yield a stable coating viscosity following dispersion. An ignition loss of equal to or less than 20 weight percent is desirable and nonmagnetic powders with low ignition losses are desirable.

When the nonmagnetic powder is an inorganic powder, the Mohs' hardness is preferably 4 to 10. Durability can be ensured if the Mohs' hardness ranges from 4 to 10. The stearic acid (SA) adsorption capacity of the nonmagnetic powder preferably ranges from 1 to 20 μmol/$m^2$, more preferably from 2 to 15 μmol/$m^2$. The heat of wetting in 25° C. water of the nonmagnetic powder is preferably within a range of 200 to 600 erg/$cm^2$ (200 to 600 mJ/$m^2$). A solvent with a heat of wetting within this range may also be employed. The quantity of water molecules on the surface at 100 to 400° C. suitably ranges from 1 to 10 pieces per 100 Angstroms. The pH of the isoelectric point in water preferably ranges from 3 to 9. The surface of these nonmagnetic powders preferably contains $Al_2O_3$, $SiO_2$, $TiO_2$, $ZrO_2$, $SnO_2$, $Sb_2O_3$, and ZnO by conducting surface treatment. The surface-treating agents of preference with regard to dispersibility are $Al_2O_3$, $SiO_2$, $TiO_2$, and $ZrO_2$, and $Al_2O_3$, $SiO_2$ and $ZrO_2$ are further preferable. They may be employed singly or in combination. Depending on the objective, a surface-treatment coating layer with a coprecipitated material may also be employed, the method which comprises a first alumina coating and a second silica coating thereover or the reverse method thereof may also be adopted. Depending on the objective, the surface-treatment coating layer may be a porous layer, with homogeneity and density being generally desirable.

Carbon black may be combined with nonmagnetic powder in the nonmagnetic layer to reduce surface resistivity, reduce light transmittance, and adjust hardness. For example, furnace black for rubber, thermal black for rubber, black for coloring, acetylene black and the like may be employed in the nonmagnetic layer.

The specific surface area of the carbon black employed in the nonmagnetic layer is, for example, 100 to 500 $m^2/g$, preferably 150 to 400 $m^2/g$. The DBP oil absorption capability is, for example, 20 to 400 mL/100 g, preferably 30 to 200 mL/100 g. The particle diameter of the carbon black is, for example, 5 to 80 nm, preferably 10 to 50 nm, and more preferably, 10 to 40 nm. It is preferable that the pH of the carbon black is 2 to 10, the moisture content is 0.1 to 10 percent, and the tap density is 0.1 to 1 g/mL. The carbon black employed may be surface-treated with a dispersant or grafted with resin, or have a partially graphite-treated surface. The carbon black may be dispersed in advance into the binder prior to addition to the coating liquid. The quantity of the carbon black is preferably within a range not exceeding 50 weight percent of the nonmagnetic powder as well as not exceeding 40 percent of the total weight of the nonmagnetic layer. These carbon blacks may be used singly or in combination. For example, the *Carbon Black Handbook* compiled by the Carbon Black Association may be consulted for types of carbon black suitable for use in the nonmagnetic layer. Commercially available carbon black can be employed.

Based on the objective, an organic powder may be added to the nonmagnetic layer. Examples of such an organic powder are acrylic styrene resin powders, benzoguanamine resin powders, melamine resin powders, and phthalocyanine pigments. Polyolefin resin powders, polyester resin powders, polyamide resin powders, polyimide resin powders, and polyfluoroethylene resins may also be employed. The manufacturing methods described in Japanese Unexamined Patent Publication (KOKAI) Showa Nos. 62-18564 and 60-255827 may be employed. The contents of the above applications are expressly incorporated herein by reference in their entirety.

Binder resins, lubricants, dispersing agents, additives, solvents, dispersion methods, and the like suited to the magnetic layer may be adopted to the nonmagnetic layer. In particular, known techniques for the quantity and type of binder resin and the quantity and type of additives and dispersion agents employed in the magnetic layer may be adopted thereto.

An undercoating layer can be provided in the magnetic recording medium of the present invention. Providing an undercoating layer can enhance adhesive strength between the support and the magnetic layer or nonmagnetic layer. For example, a polyester resin that is soluble in solvent can be employed as the undercoating layer.

Nonmagnetic Support

A known film such as biaxially-oriented polyethylene terephthalate, polyethylene naphthalate, polyamide, polyamidoimide, or aromatic polyamide can be employed as the nonmagnetic support. Of these, polyethylene terephthalate, polyethylene naphthalate, and polyamide are preferred.

These supports can be corona discharge treated, plasma treated, treated to facilitate adhesion, heat treated, or the like in advance. The center average roughness, Ra, at a cutoff value of 0.25 mm of the nonmagnetic support suitable for use in the present invention preferably ranges from 3 to 10 nm.

Layer Structure

As for the thickness structure of the magnetic recording medium of the present invention, the thickness of the nonmagnetic support preferably ranges from 3 to 80 µm. When an undercoating layer is provided between the nonmagnetic support and the nonmagnetic layer or the magnetic layer, the thickness of the undercoating layer ranges from, for example, 0.01 to 0.8 µm, preferably 0.02 to 0.6 µm.

The thickness of the magnetic layer can be optimized based on the saturation magnetization of the magnetic head employed, the length of the head gap, and the recording signal band, and is normally 10 to 150 nm, preferably 20 to 80 nm, and more preferably, 30 to 80 nm. The thickness variation in the magnetic layer is preferably within ±50 percent, more preferably within ±40 percent. At least one magnetic layer is sufficient. The magnetic layer may be divided into two or more layers having different magnetic characteristics, and a known configuration relating to multilayered magnetic layer may be applied.

The nonmagnetic layer is, for example, 0.1 to 3.0 µm, preferably 0.3 to 2.0 µm, and more preferably, 0.5 to 1.5 µm in thickness. The nonmagnetic layer of the magnetic recording medium of the present invention can exhibit its effect so long as it is substantially nonmagnetic. It can exhibit the effect of the present invention, and can be deemed to have essentially the same structure as the magnetic recording medium of the present invention, for example, even when impurities are contained or a small quantity of magnetic material is intentionally incorporated. The term "essentially the same" means that the residual magnetic flux density of the nonmagnetic layer is equal to or lower than 10 mT, or the coercive force is equal to or lower than 7.96 kA/m (equal to or lower than 100 Oe), with desirably no residual magnetic flux density or coercive force being present.

Back Layer

A back layer can be provided on the surface of the nonmagnetic support opposite to the surface on which the magnetic layer and optionally the nonmagnetic layer are provided, in the magnetic recording medium of the present invention. The back layer desirably comprises carbon black and inorganic powder. The formula of the magnetic layer or nonmagnetic layer can be applied to the binder and various additives for the formation of the back layer. The back layer is preferably equal to or less than 0.9 µm, more preferably 0.1 to 0.7 µm, in thickness.

Manufacturing Method

The process for manufacturing magnetic layer, nonmagnetic layer and back layer coating liquids normally comprises at least a kneading step, a dispersing step, and a mixing step to be carried out, if necessary, before and/or after the kneading and dispersing steps. Each of the individual steps may be divided into two or more stages. All of the starting materials employed in the present invention, including the hexagonal ferrite magnetic powder, nonmagnetic powder, binders, carbon black, abrasives, antistatic agents, lubricants, solvents, and the like, may be added at the beginning of, or during, any of the steps. Moreover, the individual starting materials may be divided up and added during two or more steps. For example, polyurethane may be divided up and added in the kneading step, the dispersion step, and the mixing step for viscosity adjustment after dispersion. To achieve the object of the present invention, conventionally known manufacturing techniques may be utilized for some of the steps. A kneader having a strong kneading force, such as an open kneader, continuous kneader, pressure kneader, or extruder is preferably employed in the kneading step. Details of the kneading process are described in Japanese Unexamined Patent Publication (KOKAI) Heisei Nos. 1-106338 and 1-79274. The contents of these applications are incorporated herein by reference in their entirety. Further, glass beads may be employed to disperse the magnetic layer, nonmagnetic layer and back layer coating liquids. Dispersing media with a high specific gravity such as zirconia beads, titania beads, and steel beads are also suitable for use. The particle diameter and filling rate of these dispersing media can be optimized for use. A known dispersing device may be employed.

In the method for manufacturing a magnetic recording medium, for example, a nonmagnetic layer coating liquid is coated to yield a prescribed film thickness on the surface of a running nonmagnetic support, thereby forming a nonmagnetic layer, and a magnetic layer coating liquid is then coated to yield a prescribed film thickness thereover, forming a magnetic layer. Multiple magnetic layer coating liquids may be successively or simultaneously coated in a multilayer coating, or a nonmagnetic layer coating liquid and magnetic layer coating liquid can be successively or simultaneously coated in a multilayer coating. Coating machines suitable for use in coating the magnetic layer and nonmagnetic layer coating liquids are air doctor coaters, blade coaters, rod coaters, extrusion coaters, air knife coaters, squeeze coaters, immersion coaters, reverse roll coaters, transfer roll coaters, gravure coaters, kiss coaters, cast coaters, spray coaters, spin coaters, and the like. For example, "Recent Coating Techniques" (May 31, 1983), issued by the Sogo Gijutsu Center K. K. may be referred to in this regard. The content of the above publication is expressly incorporated herein by reference in its entirety.

When it is a magnetic tape, the coating layer that is formed by applying the magnetic layer coating liquid can be magnetic field orientation processed using cobalt magnets or solenoids on the hexagonal ferrite magnetic powder contained in the coating layer. When it is a disk, an adequately isotropic orientation can be achieved in some products without orientation using an orientation device, but the use of a known random orientation device in which cobalt magnets are alternately arranged diagonally, or alternating fields are applied by solenoids, is desirable. Further, a known method, such as opposing magnets of opposite poles, can be employed to effect perpendicular orientation, thereby imparting an isotropic magnetic characteristic in the peripheral direction. Perpendicular orientation is particularly desirable when conducting high-density recording. Spin coating can be used to effect peripheral orientation.

The drying position of the coating is desirably controlled by controlling the temperature and flow rate of drying air, and coating speed. A coating speed of 20 m/min to 1,000 m/min and a dry air temperature of equal to or higher than 60° C. are desirable. Suitable predrying can be conducted prior to entry into the magnet zone.

The coated stock material thus obtained can be normally temporarily wound on a take-up roll, and then unwound from the take-up roll and calendered.

For example, super calender rolls can be employed in calendering. Calendering can enhance surface smoothness, eliminate voids produced by the removal of solvent during drying, and increase the fill rate of the hexagonal ferrite magnetic powder in the magnetic layer, thus yielding a magnetic recording medium of good electromagnetic characteristics. The calendering step is desirably conducted by varying the calendering conditions based on the smoothness of the surface of the coated stock material.

Rolls of a heat-resistant plastic such as epoxy, polyimide, polyamide, or polyamidoimide, can be employed as the calender rolls. Processing with metal rolls is also possible.

As for the calendering conditions, the calender roll temperature ranges from, for example, 60 to 100° C., preferably 70 to 100° C., and more preferably, 80 to 100° C. The pressure ranges from, for example, 100 to 500 kg/cm (98 to 490 kN/m), preferably 200 to 450 kg/cm (196 to 441 kN/m), and more preferably, 300 to 400 kg/cm (294 to 392 kN/m). Calendering can be conducted on the surface of the nonmagnetic layer, for example, under the above conditions.

The magnetic recording medium obtained can be cut to desired size with a cutter or the like for use. The cutter is not specifically limited, but desirably comprises multiple sets of a rotating upper blade (male blade) and lower blade (female blade). The slitting speed, engaging depth, peripheral speed ratio of the upper blade (male blade) and lower blade (female blade) (upper blade peripheral speed/lower blade peripheral speed), period of continuous use of slitting blade, and the like can be suitably selected.

EXAMPLES

The present invention will be described in detail below based on examples. However, the present invention is not limited to the examples. The term "parts" and "percent" given in Examples are weight parts and weight percent unless specifically stated otherwise.

1. Preparation of Hexagonal Ferrite Magnetic Powder

Examples 1 to 13 and Comparative Examples 1 and 2

Preparation of Hexagonal Barium Ferrite Magnetic Powder by the Glass Crystallization Method Starting materials corresponding to various elements denoted by $BaO.(Fe_2O_3)_{(12-x/2)}.(M_2O_5)_x$ (wherein M denotes a pentavalent element) were weighed out and thoroughly mixed to obtain 31.35 mole percent of BaO, 31.35 mole percent of $B_2O_3$, and 37.3 mole percent of a Ba ferrite component, yielding a starting material mixture. The starting material mixture thus obtained was charged to a platinum crucible and melted by heating at 1,350° C. in a high-frequency heating apparatus. When the starting material had completely melted, homogenization was conducted by stirring for one hour. The homogenized melt was poured onto a pair of water-cooled rollers that were being rotated at high speed to conduct rapid cooling rolling, yielding an amorphous material. The amorphous material thus obtained was thermoprocessed by being heated at a rate of 1.6° C./minute to the crystallization temperature indicated in Table 1 in a heat treatment furnace and then maintained at this crystallization temperature for 5 hours to precipitate Ba ferrite crystals. Subsequently, the precipitate was comminuted and then acid treated by stirring for 4 hours in a 10 percent acetic acid solution while regulating the solution temperature to equal to or higher than 80° C., thereby melting the BaO and $B_2O_3$. Next, washing with water was repeated a suitable number of times to remove the BaO, $B_2O_3$, and acid component. Finally, the slurry was dried, yielding magnetic powder. The characteristics of the magnetic powder thus obtained are given in Table 1 with the compositional components.

Comparative Example 3

Preparation of Hexagonal Barium Ferrite Magnetic Powder by the Reverse Micelle Method To an aqueous solution comprised of 80 millimoles of NaOH dissolved in 160 mL of pure water was admixed an alkane solution that had been obtained by mixing 108 g of Aerosol OT and 800 mL of decane to prepare a reverse micelle solution (I).

To a metal salt aqueous solution obtained by dissolving 2 millimoles of $BaCl_2.2H_2O$, 22.7 millimoles of $FeCl_3.6H_2O$, 0.56 millimole of $CoCl_2.6H_2O$, 0.50 millimole of $ZnCl_2$, and 0.24 millimole of $Nb(NO_3)_3$ in 140 mL of pure water was admixed an alkane solution obtained by mixing 54 g of Aerosol OT and 500 mL of decane to prepare a reverse micelle solution (II).

While stirring reverse micelle solution (I) at high speed in an omnimixer (made by Yamato Scientific Co., Ltd.), reverse micelle solution (II), which had been heated to 22° C., was added over 3 minutes. Stirring was conducted for 8 minutes with a magnetic stirrer, after which the mixture was heated to 50° C. and aged for 30 minutes. The mixture was cooled to room temperature and then exposed to the atmosphere. To break down the reverse micelle, a mixed solution of 500 mL of water and 500 mL of methanol was added, thereby causing it to separate into an aqueous phase and an oil phase. On the oil phase side, coprecipitated particles were obtained in a dispersed state. The oil phase side was washed twice with a mixed solution of 600 mL of water and 200 mL of methanol.

Subsequently, 2,000 mL of methanol was added to cause the coprecipitated particles to flocculate and settle out. The supernatant was removed, 100 mL of heptane was added, and the mixture was redispersed.

Sedimentation and dispersion consisting of sedimentation by adding 1,000 mL of methanol and dispersion in 100 mL of heptane were conducted twice, after which methanol was added to cause the coprecipitated particles to settle out. The supernatant was removed, after which the cycle of adding 1,000 mL of water, dispersing the mixture, conducting sedimentation, and removing the supernatant was repeated twice.

The coprecipitate obtained was analyzed to determine its composition. The coprecipitate-containing solution obtained by means of the reaction was dissolved in hydrochloric acid and measured by inductively coupled high frequency plasma (ICP) emission analysis, and the composition was calculated. A magnetoplumbite-type ferrite composition, added to within the experimental error, was contained.

The coprecipitate thus obtained was redispersed in 1 L of pure water, a solution of 0.1 mole of $CaCl_2 \cdot 6H_2O$ in pure water was added, the mixture was neutralized with $NH_4OH$, and a coating of $Ca(OH)_2$ was formed on the surface of the Ba ferrite composition particles. The precipitate was filtered, washed with water, and then dried at 120° C. The dried product was dry comminuted.

The dried product was heated to 600° C. in air to oxidize the surface coating and thermoprocessed at 800° C. to obtain Ba ferrite. The product was placed in a 5 percent acetic acid aqueous solution to remove the surface coating and magnetoplumbite-type ferrite was recovered.

Evaluation of the Magnetic Powder (1) Powder Size

The average plate diameter and average plate thickness of the magnetic powder thus obtained were determined by measuring a particle photograph taken at 400,000-fold magnification. The plate diameter and plate thickness of 500 particles with lateral surfaces that were visible were measured, and the arithmetic averages thereof were calculated. The average plate ratio was obtained as the arithmetic average of the (plate diameter/plate thickness).

(2) Magnetic Characteristics (Hc, $\sigma_s$, SFD)

The Hc and SFD of the magnetic powder obtained were measured at an applied magnetic field of 796 kA/m (10 kOe) at 23° C. with a vibrating sample fluxmeter (made by Toei Industry Co., Ltd.).

(3) Specific Surface Area

The specific surface area of the magnetic powder obtained was obtained by the BET method.

| Magnetic layer-forming coating liquid | |
|---|---|
| Barium ferrite magnetic powder (see Table 2) | 100 parts |
| Polyurethane resin | 12 parts |
| Weight average molecular weight 10,000 | |
| Sulfonic acid functional groups 0.5 meq/g | |
| α-Alumina HIT60 (made by Sumitomo Chemical Co., Ltd.) | 8 parts |
| Carbon black #55 (made by Asahi Carbon Co., Ltd.) | 0.5 part |
| Particle size 0.015 μm | |
| Stearic acid | 0.5 part |
| Butyl stearate | 2 parts |
| Methyl ethyl ketone | 180 parts |
| Cyclohexanone | 100 parts |
| Nonmagnetic layer-forming coating liquid | |
| Nonmagnetic powder α-iron oxide | 100 parts |
| Average major axis length 0.09 μm | |
| Specific surface area by BET method 50 m²/g | |
| pH 7 | |
| DBP oil absorption capacity 27 to 38 mL/100 g | |
| Surface treatment layer $Al_2O_3$ 8 weight percent | |
| Carbon black | 25 parts |
| CONDUCTEX SC-U (made by Columbian Carbon Co., Ltd.) | |
| Vinyl chloride copolymer MR104 (Zeon Corporation) | 13 parts |
| Polyurethane resin UR8200 (Toyobo Co., Ltd.) | 5 parts |
| Phenyl phosphonic acid | 3.5 parts |
| Butyl stearate | 1 part |
| Stearic acid | 2 parts |
| Methyl ethyl ketone | 205 parts |
| Cyclohexanone | 135 parts |

The various components of each of the above coating liquids were kneaded in kneaders. The coating liquid was pumped into a horizontal sandmill the dispersion part of which had been packed to 65 percent of volume with zirconia beads 1.0 mm in diameter and dispersed for 120 minutes (the substantial retention time in the dispersion part) at 2,000 rpm. To the dispersions obtained were added 5.0 parts polyisocyanate for the nonmagnetic layer coating material and 2.5 parts polyisocyanate for the magnetic layer coating material. Three parts of methyl ethyl ketone were then added. The mixtures

TABLE 1

| No. | Quantity of Nb added at % | Crystallization temp. ° C. | Hc Unit: Oe | Hc Unit: kA/m | σs A·m²/kg | SFD | Sbet m²/g | Plate diameter nm | Plate thickness nm | Plate ratio |
|---|---|---|---|---|---|---|---|---|---|---|
| Example 1 | 0.0300 | 680 | 2245 | 179 | 43.9 | 0.80 | 59.8 | 20.0 | 7.5 | 2.7 |
| Example 2 | 0.0250 | 690 | 2490 | 198 | 44.1 | 0.88 | 60.3 | 20.5 | 7.6 | 2.7 |
| Example 3 | 0.0375 | 710 | 2748 | 219 | 46.7 | 0.75 | 55.5 | 20.0 | 8.1 | 2.5 |
| Example 4 | 0.0375 | 695 | 2244 | 179 | 45.8 | 0.84 | 57.6 | 19.7 | 7.8 | 2.5 |
| Example 5 | 0.0396 | 695 | 2269 | 181 | 45.7 | 0.86 | 59.9 | 20.4 | 8.7 | 2.3 |
| Example 6 | 0.0500 | 700 | 2225 | 177 | 44.9 | 0.93 | 60.2 | 19.2 | 8.6 | 2.2 |
| Example 7 | 0.0275 | 660 | 2163 | 172 | 44.9 | 0.90 | 66.4 | 19.0 | 7.5 | 2.5 |
| Example 8 | 0.0275 | 660 | 2130 | 170 | 44.6 | 0.85 | 64.4 | 15.5 | 6.7 | 2.3 |
| Example 9 | 0.0433 | 710 | 2600 | 207 | 45.7 | 0.70 | 53.9 | 17.5 | 8.2 | 2.1 |
| Example 10 | 0.0325 | 710 | 2813 | 224 | 47.3 | 0.65 | 53.9 | 18.6 | 7.8 | 2.4 |
| Example 11 | 0.0375 | 710 | 2740 | 218 | 46.7 | 0.83 | 54.5 | 23.0 | 9.4 | 2.4 |
| Example 12 | 0.0325 | 710 | 2795 | 222 | 46.3 | 0.78 | 54.0 | 19.6 | 8.3 | 2.4 |
| Example 13 | 0.0525 | 660 | 2050 | 163 | 44.3 | 0.89 | 56.9 | 18.9 | 8.0 | 2.4 |
| Comp. Ex. 1 | 0.0150 | 670 | 3200 | 255 | 46.1 | 0.63 | 59.4 | 21.6 | 7.2 | 3.0 |
| Comp. Ex. 2 | 0.0146 | 640 | 2656 | 211 | 44.2 | 0.75 | 70.0 | 20.5 | 6.8 | 3.0 |
| Comp. Ex. 3 | — | 750 | 2165 | 172 | 49.5 | 1.08 | 62.3 | 21.3 | 8.5 | 2.5 |

2. Preparation and Evaluation of Magnetic Tape

Preparation of Magnetic Tape were filtered with filters having an average pore diameter of 1 μm to prepare nonmagnetic layer-forming and magnetic layer-forming coating liquids.

The nonmagnetic layer-forming coating liquid thus obtained was coated and dried to a thickness of 1.5 μm on a polyethylene terephthalate base 4 μm in thickness, after which the magnetic layer-forming coating liquid was coated to a dry magnetic layer thickness of 0.10 μm in sequential multilayer coating. While still wet, the magnetic layer was oriented with a cobalt magnet having a magnetic force of 6,000 G (600 mT) and a solenoid having a magnetic force of 6,000 G (600 mT) and dried. Next, processing was conducted with a seven-stage calender at a temperature of 90° C. and a linear pressure of 300 kg/cm (294 kN/m). Subsequently, a back layer 0.5 μm in thickness (100 parts of carbon black with an average particle size of 17 nm, 80 parts of calcium carbonate with an average particle size of 40 nm, and 5 parts of α-alumina with an average particle size of 200 nm dispersed in nitrocellulose resin, polyurethane resin, and polyisocyanate) was coated. The product was slit to a width of 3.8 mm, and the surface of the magnetic layer was cleaned with a tape cleaning device by mounting it on a device equipped with slit product feeding and winding devices so that a nonwoven fabric and razor blade contacted with a magnetic surface, yielding a magnetic tape medium.

Evaluation of Magnetic Tape (1) Magnetic characteristics (Hc, SQ, SFD)

The Hc, SQ, and SFD of the magnetic tape thus prepared were measured at an applied magnetic field of 796 kA/m (10 kOe) at 23° C. with a vibrating sample fluxmeter (made by Toei Industry Co., Ltd.).

(2) Center Surface Average Roughness Ra

A 250 μm square sample area was measured with an optical interference profilometer, HD-2000, made by WYKO (Arizona, U.S.). When calculating the measurement values, corrections such as incline correction, spherical correction, and cylindrical correction were made for the calculation of the measurement values in accordance with JIS-B601, and the center surface average roughness Ra was employed as an indicator of surface roughness.

(3) Output, SNR

A recording head (MIG, gap 0.15 μm, 1.8 T) and reproduction AMR head were mounted on a drum tester and the output and noise were measured. A head-to-medium relative speed of 15 m/s was employed and the modulation noise was measured. The S/N ratio was denoted with Comparative Example 4 as 0 dB.

| Nonmagnetic layer-forming coating liquid | |
|---|---|
| Nonmagnetic powder α-iron oxide<br>Average major axis length 0.09 μm<br>Specific surface area by BET method 50 m$_2$/g<br>pH 7<br>DBP oil absorption capacity 27 to 38 mL/100 g<br>Surface treatment layer Al$_2$O$_3$ 8 weight percent | 100 parts |
| Carbon black<br>CONDUCTEX SC-U (made by Columbian Carbon Co., Ltd.) | 25 parts |
| Vinyl chloride copolymer MR104 (made by Zeon Corporation) | 3 parts |
| Polyurethane resin UR8200 (made by Toyobo Co., Ltd.) | 5 parts |
| Phenyl phosphonic acid | 3.5 parts |
| Butyl stearate | 1 part |
| Stearic acid | 2 parts |
| Methyl ethyl ketone | 205 parts |
| Cyclohexanone | 135 parts |

The various components of each of the above coating liquids were kneaded in a kneader. The coating liquids were pumped into horizontal sandmills the dispersion part of which had been packed to 65 percent of volume with zirconia beads 1.0 mm in diameter and dispersed for 120 minutes (the substantial retention time in the dispersion part) at 2,000 rpm. To the dispersions obtained were added 6.5 parts of polyisocyanate for the nonmagnetic layer coating material and 2.5 parts of polyisocyanate for the magnetic layer coating material. Seven parts of methyl ethyl ketone were then added. The mixtures were filtered with filters having an average pore diameter of 1 μm to prepare nonmagnetic layer-forming and magnetic layer-forming coating liquids.

The nonmagnetic layer-forming coating liquid thus obtained was coated and dried to a dry thickness of 1.5 μm on

TABLE 2

| No. | Magnetic powder employed | Hc Unit: Oe | Hc Unit: kA/m | SQ | SFD | Ra nm | Output dB | SNR dB |
|---|---|---|---|---|---|---|---|---|
| Example 14 | Example 1 | 1978 | 157 | 0.68 | 0.52 | 2.0 | 1.0 | 2.5 |
| Example 15 | Example 8 | 1837 | 146 | 0.65 | 0.45 | 1.5 | 2.0 | 3.0 |
| Example 16 | Example 9 | 2569 | 204 | 0.70 | 0.40 | 1.8 | 1.5 | 2.0 |
| Example 17 | Example 11 | 2453 | 195 | 0.75 | 0.38 | 1.9 | 1.0 | 1.0 |
| Comp. Ex. 4 | Comp. Ex. 1 | 2965 | 236 | 0.61 | 0.65 | 2.5 | 0.0 | 0.0 |
| Comp. Ex. 5 | Comp. Ex. 3 | 1956 | 156 | 0.62 | 0.73 | 2.3 | −0.8 | −1.5 |

3. Preparation and Evaluation of Magnetic Disk

Preparation of Magnetic Disk

| Magnetic layer-forming coating liquid | |
|---|---|
| Barium ferrite magnetic powder (see Table 3)<br>Polyurethane resin<br>Weight average molecular weight 10,000<br>Sulfonic acid functional groups 0.5 meq/g | 100 parts<br>12 parts |
| Diamond microparticles<br>Average particle diameter 0.10 μm | 2 parts |
| Carbon black #55 (made by Asahi Carbon Co., Ltd.)<br>Particle size 0.015 μm | 0.5 part |
| Stearic acid | 0.5 part |
| Butyl stearate | 2 parts |
| Methyl ethyl ketone | 230 parts |
| Cyclohexanone | 150 parts | a polyethylene terephthalate base 62 μm in thickness, after which the magnetic layer-forming coating liquid was coated so as to yield a dry magnetic layer thickness of 0.10 μm in sequential multilayer coating. Following drying, processing was conducted with a seven-stage calender at a temperature of 90° C. and a linear pressure of 300 kg/cm. These operations were conducted on both surfaces of the nonmagnetic support. The product was then punched to a 3.5 inch diameter and surface polished, yielding a magnetic disk medium.

Evaluation of the Magnetic Disk

The magnetic characteristics and Ra of the magnetic disk medium obtained were measured in the same manner as for the magnetic tape medium. The output and noise were measured with a recording head (MIG, gap 0.15 μm, 1.8 T) and reproduction GMR head mounted on a spin stand. The medium rotational speed was 4,000 rpm and the recording wavelength was 0.2 μm. The modulation noise was measured. The S/N ratio was denoted with Comparative Example 6 as 0 dB.

TABLE 3

| No. | Magnetic powder employed | Hc Unit: Oe | Hc Unit: kA/m | SQ | SFD | Ra nm | Output dB | SNR dB |
|---|---|---|---|---|---|---|---|---|
| Example 18 | Example 1 | 1753 | 140 | 0.53 | 0.43 | 2.3 | 1.3 | 2.0 |
| Example 19 | Example 9 | 2350 | 187 | 0.51 | 0.40 | 2.1 | 2.0 | 2.5 |
| Example 20 | Example 11 | 2200 | 175 | 0.50 | 0.42 | 2.2 | 1.5 | 1.5 |
| Comp. Ex. 6 | Comp. Ex. 1 | 2705 | 215 | 0.48 | 0.61 | 2.8 | 0.0 | 0.0 |

Evaluation Results

It will be understood from the results in Table 1 that the magnetic powders prepared in Examples inhibited the increase in SFD better than those of Comparative Examples despite a smaller plate diameter. It will be understood from the results in Tables 2 and 3 that the magnetic powders prepared in Examples exhibited both good output characteristics and low noise.

The magnetic recording medium of the present invention is suitable as a magnetic recording medium for high-density recording.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A hexagonal ferrite magnetic powder which is manufactured by a glass crystallization method and which has an average plate diameter ranging from 15 to 25 nm, an average plate ratio ranging from 2.0 to 2.8 and a coercive force (Hc) ranging from 163 to 279 kA/m,
the powder containing, as an element substituting for Fe, only a pentavalent element selected from the group consisting of Nb and Ta, in a quantity of equal to or greater than 2.5 atomic percent when the sum of the pentavalent element and Fe is adopted as 100 atomic percent.

2. The hexagonal ferrite magnetic powder according to claim 1, which contains the pentavalent element in a quantity ranging from 2.5 atomic percent to 6 atomic percent when the sum of the pentavalent element and Fe is adopted as 100 atomic percent.

3. The hexagonal ferrite magnetic powder according to claim 1, which contains only Nb as the pentavalent element.

4. A magnetic recording medium comprising a magnetic layer comprising a hexagonal ferrite magnetic powder and a binder on a nonmagnetic support, wherein
the hexagonal ferrite magnetic powder is one manufactured by a glass crystallization method and has an average plate diameter ranging from 15 to 25 nm, an average plate ratio ranging from 2.0 to 2.8 and a coercive force (Hc) ranging from 163 to 279 kA/m,
the powder containing, as an element substituting for Fe, only a pentavalent element selected from the group consisting of Nb and Ta, in a quantity of equal to or greater than 2.5 atomic percent when the sum of the pentavalent element and Fe is adopted as 100 atomic percent.

5. The magnetic recording medium according to claim 4, wherein the hexagonal ferrite magnetic powder contains the pentavalent element in a quantity ranging from 2.5 atomic percent to 6 atomic percent when the sum of the pentavalent element and Fe is adopted as 100 atomic percent.

6. The magnetic recording medium according to claim 4, wherein the hexagonal ferrite magnetic powder contains only Nb as the pentavalent element.

7. The hexagonal ferrite magnetic powder according to claim 1, wherein the coercive force (Hc) is within the range of from 167 to 279 kA/m.

8. The hexagonal ferrite magnetic powder according to claim 1, wherein the coercive force (Hc) is within the range of from 175 to 279 kA/m.

9. The magnetic recording medium according to claim 4, wherein the coercive force (Hc) is within the range of from 167 to 279 kA/m.

10. The magnetic recording medium according to claim 4, wherein the coercive force (Hc) is within the range of from 175 to 279 kA/m.

11. A glass crystallization method of manufacturing a hexagonal ferrite magnetic powder comprising:
preparing a melt by melting a starting material mixture comprising a glass-forming component and a hexagonal ferrite-forming component;
rapidly cooling the melt to obtain a solid; and
heating the solid to precipitate a hexagonal ferrite magnetic powder, wherein
the hexagonal ferrite-forming component contains, as a component substituting for Fe, only a pentavalent element component selected from the group consisting of $Nb_2O_5$ component and $Ta_2O_5$ component,
the starting material mixture comprises a pentavalent element selected from the group consisting of Nb and Ta in a quantity of equal to or greater than 2.5 atomic percent when a sum of the pentavalent element and Fe is adopted as 100 atomic percent, and
the hexagonal ferrite magnetic powder has an average plate diameter ranging from 15 to 25 nm, an average plate ratio ranging from 2.0 to 2.8, and a coercive force (Hc) ranging from 163 to 279 kA/m.

12. The method of manufacturing a hexagonal ferrite magnetic powder according to claim 11, wherein the pentavalent element component consists of $Nb_2O_5$ component.

13. The method of manufacturing a hexagonal ferrite magnetic powder according to claim 11, wherein the starting material mixture contains a pentavalent element selected from the group consisting of Nb and Ta in a quantity ranging from 2.5 atomic percent to 6 atomic percent when a sum of the pentavalent element and Fe is adopted as 100 atomic percent.

14. A method of manufacturing a magnetic recording medium comprising:
 manufacturing a hexagonal ferrite magnetic powder; and
 forming a magnetic layer using the hexagonal ferrite magnetic powder manufactured, wherein the hexagonal ferrite magnetic powder is manufactured by the following glass crystallization method:
 preparing a melt by melting a starting material mixture comprising a glass-forming component and a hexagonal ferrite-forming component;
 rapidly cooling the melt to obtain a solid; and
 heating the solid to precipitate a hexagonal ferrite magnetic powder, wherein
 the hexagonal ferrite-forming component contains, as a component substituting for Fe, only a pentavalent element component selected from the group consisting of $Nb_2O_5$ component and $Ta_2O_5$ component,
 the starting material mixture contains a pentavalent element selected from the group consisting of Nb and Ta in a quantity of equal to or greater than 2.5 atomic percent when a sum of the pentavalent element and Fe is adopted as 100 atomic percent, and
 the hexagonal ferrite magnetic powder has an average plate diameter ranging from 15 to 25 nm, an average plate ratio ranging from 2.0 to 2.8, and a coercive force (Hc) ranging from 163 to 279 kA/m.

15. The method of manufacturing a magnetic recording medium according to claim 14, wherein the pentavalent element component consists of $Nb_2O_5$ component.

16. The method of manufacturing a magnetic recording medium according to claim 14, wherein the starting material mixture contains a pentavalent element selected from the group consisting of Nb and Ta in a quantity ranging from 2.5 atomic percent to 6 atomic percent when a sum of the pentavalent element and Fe is adopted as 100 atomic percent.

* * * * *